PROCESS FOR PICKLING METAL AND PROCESSING PICKLING LIQUORS
Filed April 4, 1966 3 Sheets-Sheet 1
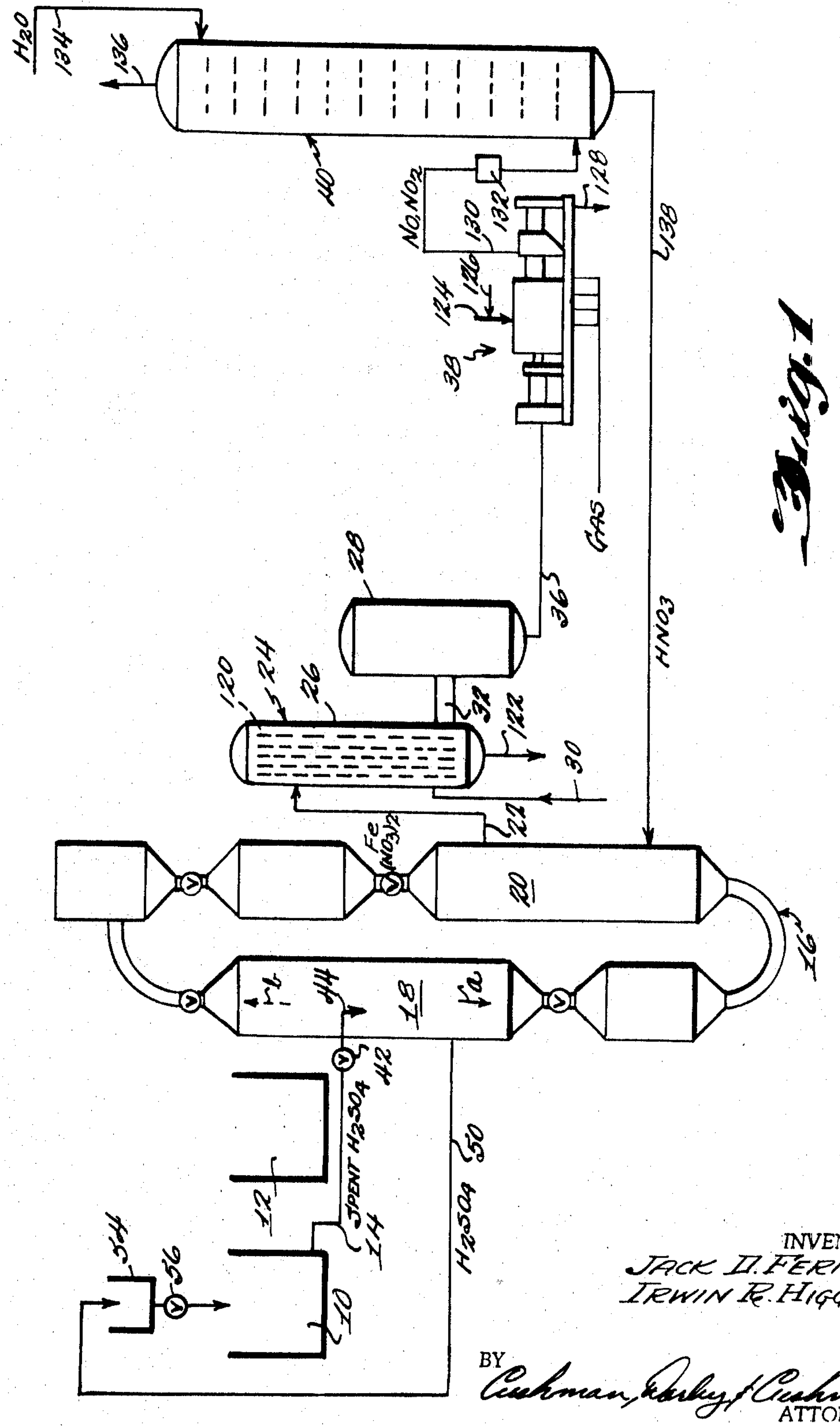
INVENTORS
JACK D. FERNER
IRWIN R. HIGGINS
BY
Cushman, Darby & Cushman
ATTORNEYS PROCESS FOR PICKLING METAL AND PROCESSING PICKLING LIQUORS
Filed April 4, 1966 3 Sheets-Sheet 2
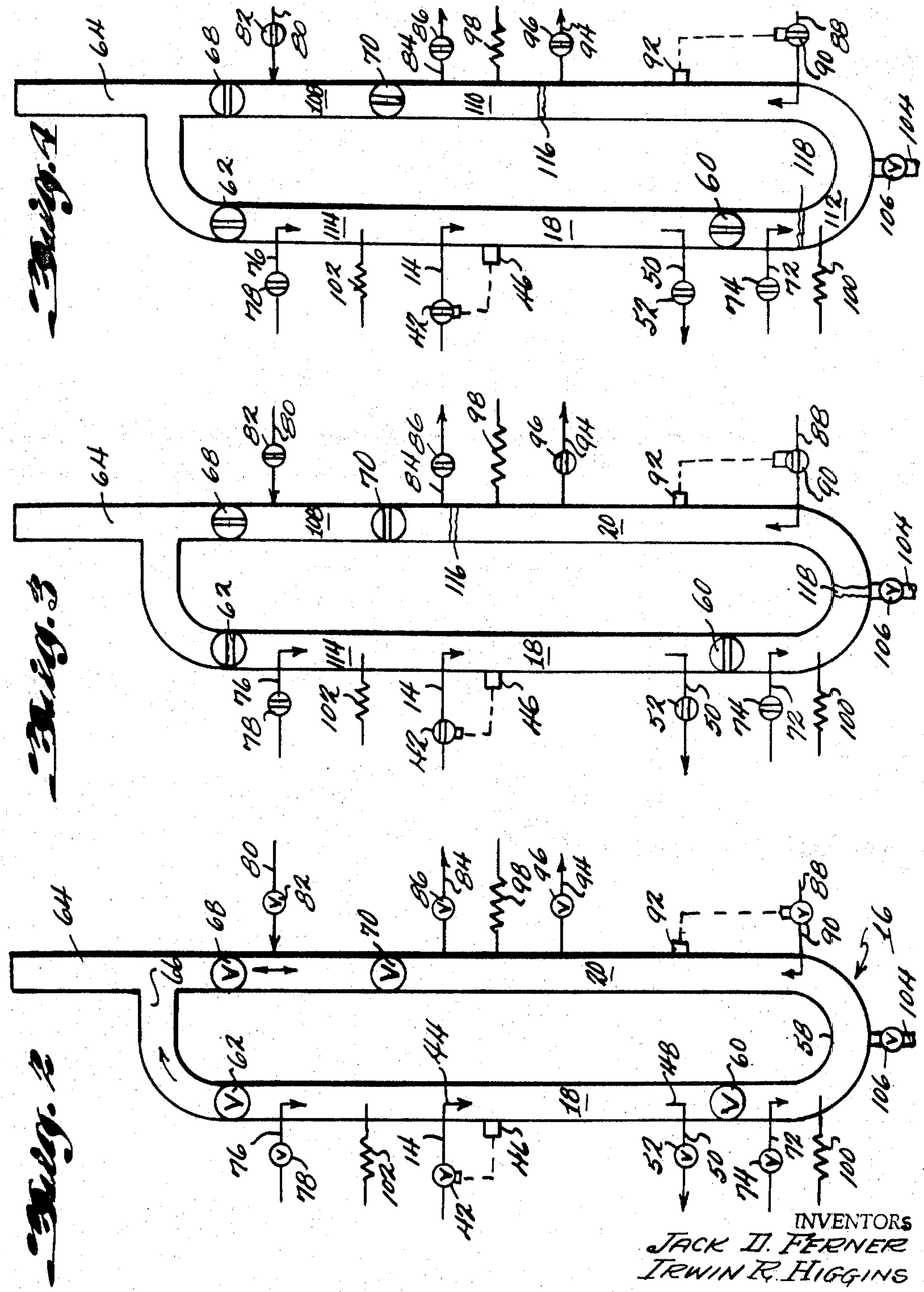
INVENTORS
JACK D. FERNER
IRWIN R. HIGGINS
BY Cushman, Darby & Cushman
ATTORNEYS

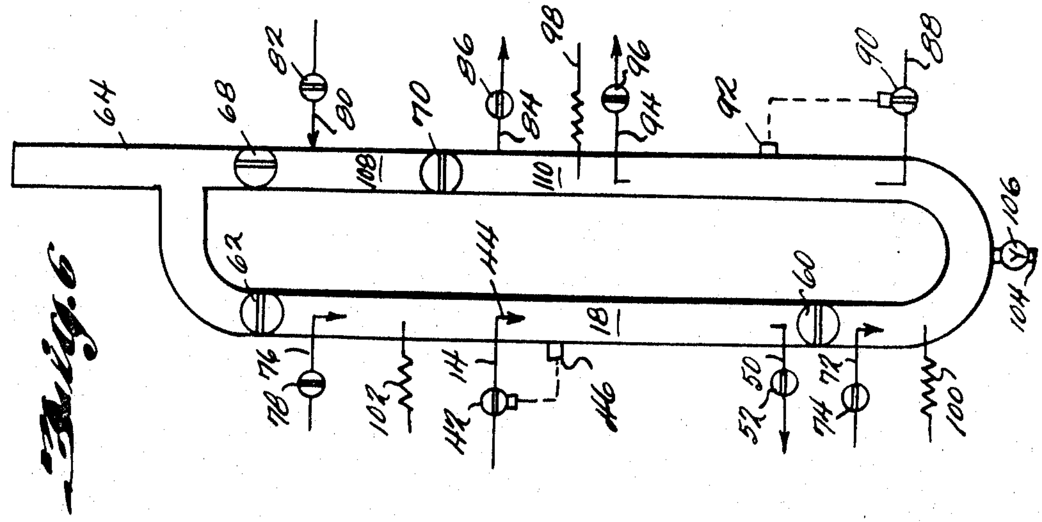
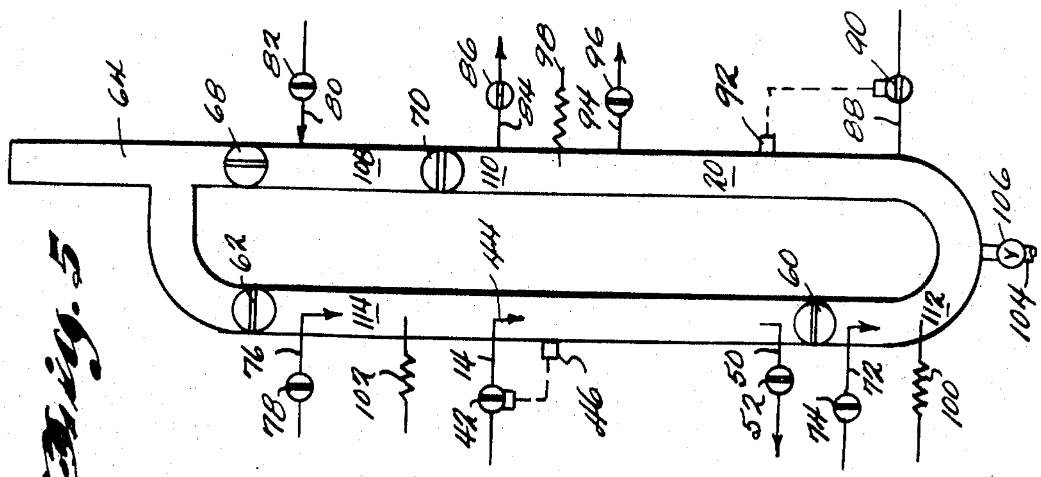
INVENTORS
JACK D. FERNER
IRWIN R. HIGGINS
BY Cushman, Darby & Cushman
ATTORNEYS

United States Patent Office 3,470,022
Patented Sept. 30, 1969

3,470,022

PROCESS FOR PICKLING METAL AND PROCESSING PICKLING LIQUORS

Jack D. Ferner and Irwin R. Higgins, Oak Ridge, Tenn., assignors to Chemical Separations Corporation, Oak Ridge, Tenn., a corporation of Tennessee Filed Apr. 4, 1966, Ser. No. 540,087
Int. Cl. C23g *1/08, 1/36;* B01j *1/04*
U.S. Cl. 134—3 13 Claims

ABSTRACT OF THE DISCLOSURE

A continuous cyclic process for the pickling of metal, for regenerating spent pickle liquor and for regenerating an agent employed to regenerate the spent pickle liquor which includes conducting the pickling operation with a pickle liquor comprising an aqueous solution of a pickle liquor acid having an acid concentration maintained within the range of about 5 to 20 weight percent, said acid having a $pK_a$ ranging from $10^{-4}$ to 1, and a metal salt of said acid, the concentration of said metal salt being maintained within the range of about 1 to 10 weight percent, continuously withdrawing spent pickle liquor from the pickling step for regeneration, said regenerations comprising flowing said spent pickle through a first section of a cation exchange column loop having a shiftable cation exchange resin bed therein, to bring the same into contact with a first portion of cation exchange resin therein and exchanging metal ions from the spent pickle liquor for hydrogen ions of the exchange resin; while withdrawing from said first section regenerated pickle liquor, continuously recirculating the regenerated pickle liquor to the pickling step, treating a second portion of said cation exchange resin loaded with metal ions from above with a regenerating agent in a second section of the column loop, interrupting the flow of said spent pickle liquor and said regenerating agent, shifting the cation exchange resin bed in the cation exchange column loop from one section thereof to another contiguous section therein, thereby replacing at least a portion of the resin in the first section with another portion of the resin previously regenerated in the second section and displacing a portion of resin carrying the metal ions previously eliminated from the spent pickle liquor into the second section for regeneration thereof, withdrawing from the second section a solution of metal salt of regenerating agent, concentrating the metal salt solution, decomposing the metal salt solution to provide a metal oxide and a gaseous product, treating the gaseous product to produce the regenerating agent and continuously recycling the regenerated regenerating agent to the second section of the column loop.

This invention relates to apparatus for and method of pickling metal and for regenerating spent pickle liquor for recycle to the pickling metal process.

In the processing of fabricated forms of metal such as sheets, strips, wire and the like a pickling step is employed to remove mill scale or metal oxide from the metal surface. There is conventionally employed for this purpose a relatively dilute solution of a suitable acid having a concentration ranging from about 5 to 20 percent acid. In the course of the pickling operation, metal oxide is dissolved by the acid with the formation, generally, of a metal salt. The concentration of the metal salt in the pickling bath eventually reaches a value where the pickle liquor ceases to function efficiently.

Further, it has been considered conventional practice to continue the pickling process for a time sufficient to reduce the free acid content of the spent pickle liquor to a point where disposal of the waste liquor does not involve too great an economic loss. When such practices are employed, however, a lack of uniformity of pickling of the metal has been encountered.

In addition to economic considerations other serious problems associated with disposal of waste pickling liquor have been encountered by industry. The existence of municipal and State laws against stream pollution has emphasized to those industries which generate waste pickle liquor the desideratum for disposing of waste pickle liquor without polluting streams or the atmosphere.

Efforts to achieve such goals have developed several alternative disposal methods. For instance, it is known to neutralize the spent liquor with lime to form a precipitate. Such a method has certain disadvantages in that expenditures are required not only for the neutralization agent but also for the provision of dump sites and transportation costs thereto. Moreover, such methods do not guarantee that the dumped neutralized pickle liquor will not contaminate underground streams or wells, thus exposing the practitioner to legal action.

Yet other efforts have been directed to treating the spent pickle liquor with a view to recovering a by-product. Often such efforts have culminated in a process whereby crystallization procedures are employed, thus necessitating the provision of costly apparatus which significantly minimize the value or attractiveness of such processes from an economic viewpoint. Still other efforts resulted in practices whereby the spent pickle liquor undergoes evaporation techniques which require high heat input and large bulk handling equipment, often made of costly materials to withstand the highly corrosive nature of the material being processed. Ordinarily, the byproduct of such methods include a metal oxide or metal salt such as iron oxide or iron sulfate.

Further, efforts to achieve an overall efficient and economic process have, heretofore, resulted in certain methods whereby the spent pickle liquor is regenerated to produce the acid component of the pickle liquor suitable for recycle to the pickling bath as well as the production of a by-product. These methods, however, have generally been characterized as uneconomical and have not therefore been practiced commercially on any significant scale.

It is therefore a principal object of the present invention to provide a method of processing spent pickle liquor which overcomes the disadvantages of prior art methods.

Another object of the instant invention is to provide a novel apparatus and method for pickling metal and for regenerating spent pickle liquor.

Yet another object of the instant invention is to provide a novel apparatus and method which increase the efficiency of the pickling process.

A further object of the instant invention is to provide a novel apparatus and method for pickling metal and for regenerating the pickle liquor, by which regeneration, the liquor is highly suitable for recycle to the pickling process and for the production of a by-product of value and for the substantial elimination of waste disposal problems.

Yet a further object of the instant invention is to provide a novel apparatus and method for pickling metal which result in increased uniformity of pickling liquor concentration and substantial increase in control and uniformity of pickling of the metal.

Other objects and advantages will be apparent from the following description taken in connection with the accompanying drawings wherein:

FIGURE 1 is a flow sheet for an embodiment of the invention;

FIGURE 2 schematically illustrates an ion exchange column loop for regenerating a spent pickle liquor and for production of a metal salt of regenerating agent; and FIGURES 3, 4, 5 and 6 schematically illustrate the various stages of the operation of the ion exchange system of FIGURE 2.

The present invention provides for a correlation between the acid content of the pickle liquor bath solution and the regenerated acid recycled to the pickle liquor bath solution so as to obtain an efficient rate of pickling which is substantially uniform for the metal being pickled. To this end, it has been found that maintaining the pickle liquor at an acid concentration of about 10 to 20 percent and metal salt concentration of about 1 to 10 percent then such uniformity of pickling of the metal is achieved.

In combination with a pickling system controlled as to pickle liquor bath solution composition the instant invention also provides regeneration apparatus to obtain from the spent liquor, acid suitable for recycle to the pickling liquor and an acid salt adaptable to provide a metal oxide of value as well as regenerating agent.

General description of apparatus and method

The apparatus shown diagrammatically in FIGURE 1 includes only the major elements thereof and particularly illustrates the relationship of the regenerated pickle liquor bath solution acid to the pickling process as well as the relationship between a regenerated regenerating agent to the pickle liquor regenerating process. In this figure there is shown one pickle tank, indicated at 10, although it should be realized that a plurality of such tanks can conveniently be employed and the contents thereof controlled according to the instant invention. The number of pickle tanks employed will depend on a number of factors, one of which is the form of the metal to be pickled as it comes from the mill. For instance, steel which comes from the mill as strip steel generally is processed in about four pickle tanks. The strip steel usually is in rolls or coils although such coils are unrolled and the strip is passed continuously through the series of four pickle tanks. The rear end of each strip ordinarily is connected to the lead end of the next strip by such means as a seam weld which subsequently can be easily disposed of, if desired, by cutting out the seam after the pickling is completed.

The steel, after pickling, is led by any convenient means to a rinse zone comprising at least one rinse tank 12. Although, again, it should be recognized that while only one such rinse tank is shown, generally, a plurality of rinse tanks can advantageously be employed. From the pickle tank 10, spent pickle liquor is withdrawn and conducted via line 14 to the regenerative part of the apparatus.

As illustrated in FIGURE 1, the regenerative part of the apparatus of this invention comprises a continuous ion exchange column loop system 16 having two operating ion exchange sections, i.e., a loading section 18 and a stripping section 20. The direction of liquid flow is indicated by the solid arrows *a* and the direction of resin flow is indicated by the open arrows *b*. It will be noted that the solution generally flows countercurrent to the movement of the resin. An apparatus which can be used in the regenerative portion of the instant invention is disclosed in U.S. Patent 2,815,322 issued Dec. 3, 1957 to the present inventor.

Referring again to FIGURE 1, the approach of regeneration procedure of the instant invention will be seen with reference to the chemicals noted thereon. It should, of course, be recognized that the particular chemicals identified are representative only, as a number of such chemicals can be used, depending on such factors as the particular pickle liquor originally employed, the particular metal being pickled, the choice of the regenerating agent, etc. Thus, a spent pickle liquor containing a metal ion and a pickle liquor acid anion enters through pipe 14 into the loading section 18. This loading section contains a strong acid type cation exchange resin in the acid form, and as the spent pickle liquor flows therethrough, the hydrogen ions are exchanged into solution and the metal ions are absorbed on the resin. Thus a solution of pickle liquor acid is taken off from the loading section and advantageously recycled to the pickling zone where it can be introduced into the pickling tank 10 at a rate substantially equal to the rate at which it is depleted and withdrawn via line 14, thus substantially controlling the composition of the pickle liquor in tank 10 at a level at which optimum pickling procedures are achieved.

The metal ion rich resin now in the loading section 18 is shifted to the stripping section 20. In stripping section 20, a regenerating acid solution is passed through the resin, and metal ions are exchanged into solution with absorption of hydrogen ions. Thus, the solution removed from the stripping section 20 is a metal salt of the regenerating acid solution.

It will be appreciated that in order to practice this portion of the overall process, certain conditions must exist and be controlled. It is important to control the aqueous composition in various parts of the loop so that the spent pickle liquor solution is confined essentially to the loading section and the regenerating solution is confined essentially to the stripping section. Means can also be provided to shift the resin bed no more and no less than a certain amount in order that proper and efficient exchange will take place. Further, the volume, flow rate and concentration of the chemical solutions must be balanced so that the metal salt solution leaving the stripping section is not excessively acid although excess acid should be present and that the metal values are, nevertheless, effectively removed from the spent pickle liquor.

The metal salt solution removed from the stripping section 20 is led via line 22 to an evaporation operation wherein the concentration of the metal salt solution can be continued to the point of incipient precipitation. The evaporator 24 can be any conventional unit, for instance, a rubber lined steel unit provided with a vertical tube exchange 26 and reflux unit 28. Steam to the unit can be supplied by plant boiler (not shown) through a steam header and steam line 30. The extent of concentration in the evaporator will depend on the particular metal salt solution being treated and can be readily determined by experimentation to determine the point of incipient precipitation.

The concentrated metal salt solution resulting from the evaporator is withdrawn through line 36 and passed to a decomposition unit 38 which is a forced circulation horizontal tube calciner. The metal salt solution is decomposed to produce metal and nonmetal oxides, the metal oxides providing a by-product of value, the nonmetal oxides being led to a scrub tower 40 where they are converted to regenerating agent suitable for recycle to the spent pickle liquor regenerating portion of the apparatus, i.e. the continuous column loop system 16.

Description of apparatus and method of the pickling unit

As stated before, any number of pickling tanks 10 can be employed depending on the particular metal to be pickled, the extent of pickling required, i.e. the quantity of mill scale to be removed and the form of the metal being pickled. Generally, the pickling tank is fabricated or treated with material sufficiently inert to the pickle liquor contained therein. Usually the pickle liquor is made up by first filling the tank with preheated industrial water. When the water reaches near the working level of the bath, acid is added in a predetermined amount necessary to make a concentration of about 10 to 20 percent acid by weight. Ordinarily, acid additions are made by opening valve means (not shown) on the acid feed line to the tank. The valve means can, preferably, be automatically controlled by, for instance, a flowmeter-indicator apparatus and on completion of delivery to the tank of a predetermined amount, the valve means can be closed. It has been found advantageous to employ conventional inhibitors in the pickling baths and generally the addition is made with make-up acid or independently to the pickle tank.

The pickling bath during the pickling operation can be automatically titrated at predetermined intervals, the results of titration automatically controlling (1) the addition of make-up acid to the bath and (2) the removal of spent pickle liquor in amounts to maintain the pickling bath composition essentially constant. The advantageous result of this mode of operation is that it obviates prior art practices which required working the bath to an extremely low acid concentration, say about 1% while the acid salt concentration became excessively high in order to facilitate disposal of the waste pickle liquor. Such operations produced nonuniform pickling results.

Ordinarily, pickling time in the pickling bath will vary widely depending on a number of easily ascertainable factors such as the type of metal being pickled, the particular pickle bath chosen, etc.

The type of pickle acid employed in making up the pickle bath will also depend on a number of factors such as the extent of pickling desired, the type of metal being pickled. Many acids are suitably employed with the instant invention and representative of such acids are sulfuric, phosphoric and hydrochloric as well as organic acids such as citric. It has been found that acids having a pKa ranging from $10^{-4}$ to 1 are advantageously employed with the instant invention. Usually, the pickling bath is maintained, during operation, such that the acid concentration will range between 5 to 20 percent by weight of said bath solution while the metal salt concentration will range between 1 to 10 percent by weight of said bath solution. The temperature of the bath conveniently can range from ambient temperature to as high as 100° C. Higher temperatures can be employed but ordinarily when so used, pressures sufficient to keep the pickling bath in liquid form are required which unnecessarily adds to the expense of the operation.

After pickling the metal for a time sufficient to remove the mill scale, the metal is withdrawn from the pickle tank 10 by any convenient means and introduced into a rinse tank 12. Any number of such tanks can be employed and are generally lined with acid resistant brick liners. The tank can be filled with industrial water and is provided with an outlet line (not shown) leading, for instance, to a sewer or other disposal site.

When the pickling bath reaches a predetermined composition with respect to the acid and metal salt content thereof, spent pickle liquor can be withdrawn at a rate substantially comparable to the rate of introduction of regenerated pickle acid and industrial water to maintain the pickle bath solution substantially constant.

Description of the apparatus and method of the regeneration unit

As shown best in FIGURE 2, spent pickle liquor enters ion exchange column 16 through valve 42 via pipe 14 and distributing means 44. Valve 42, preferably, is automatically controlled by a metal-hydrogen detector 46 located adjacent the loading section 18 of the column 16. Distributing means 44 is located at the upper end of loading section 18 of the column 16. The spent pickle liquor delivered from the distributor 44 into loading section 18 passes downward through the cation exchange resin which completely fills section 18 and on which is absorbed the metal value thereof. Regenerated pickle bath solution acid passes out of this section through collecting means 48 and pipe 50 provided with valve 52 which leads to a hold tank 54. Hold tank 54 can be provided with an outlet 56 adaptable to be in communication with the pickling tank 10 so that on withdrawal of spent liquor from the latter regenerated pickle bath solution acid from the holding tank can be introduced therein. If necessary concentrated pickling acid can be introduced into the holding tank 54 to compensate for any dilution of the regenerated pickling acid.

The continuous ion exchange column 16 includes the loading section 18 which is arranged to permit upward flow of the resin from the loading section and the stripping section 20 arranged for downward flow of the resin. It should be recognized however, that these flows are only relative and can, of course, be reversed, the importance of the arrangement residing in the fact that the flow of resin to solution is countercurrent.

Resin circulating conduit 58 extends downward from stripping section 20 and then extends vertically alongside and to a level above the loading section 18. It is also provided with resin valves 60 and 62 which control the flow of the resin in this portion of the loop of the column 16. Conduit 58 then opens into the upper resin reservoir 64 at orifice 66. Reservoir 64 is also provided with two resin valves 68 and 70 which serve to control the flow of the resin.

As shown, reservoir 64 extends above communicating orifice 66 and is provided with a means to permit overflow of waste wash water and resin fines into a disposal or resin fines recovery unit (not shown).

The section of the loop of column 16 located between resin valves 60 and 62 in conduit 58 is the loading section 18 and this section is provided to adsorb the metal ions on the resin from the incoming spent pickle liquor. During the loading operation, the spent pickle liquor is delivered through pipe 14 controlled by valve 42 which in turn is responsive to the metal-hydrogen detector 46, into the loading section 18 of the resin circulating conduit 58 at a point somewhat removed from and below resin valve 62. The spent pickle liquor flows downwardly through loading section 18 of conduit 58. Regenerated pickling acid then leaves conduit 58 through pipe 50 controlled by valve 52 for conveyance to holding tank 54. Resin circulating conduit 58 is also provided with water line 72 controlled by valve 74 and adapted to deliver water from a source (not shown) into conduit 58. As shown, water pipe 72 enters into resin conduit 58 at a point below resin valve 60. A second water pipe 76, leading from a source (not shown) and controlled by valve 78 is arranged to enter loading section 18 just below resin valve 62.

Resin return conduit 64 is also provided with water lines for delivery and removal of wash water. Pipe 80 controlled by valve 82 is provided for delivery of water from a source (not shown). Pipe 80, as shown, opens into conduit 64 at a point below resin valve 68. Conduit 64 is also provided with water outlet line 84 controlled by valve 86 for removal of waste wash water at a point between resin valve 70 and stripping section 20.

Stripping section 20 is provided with line 88 controlled by valve 90 which in turn is also responsive to a metal-hydrogen detector 92 for introducing stripping or resin regenerating agent into this section. The flow of stripping agent is upward or countercurrent to the downwardly flowing metal ion containing resin. Regenerating acid metal salt outlet 94, controlled by valve 96 is located adjacent the upper end of the stripping section 20 and below the conductivity probe 98.

As a further and important feature of this invention, means are provided for the substantially automatic control of the operation of these various valves in the wash water and loading section lines in such a manner as to insure that the resin regenerating agent is not contaminated or adulterated with either the wash water or the spent pickle liquor.

These control means comprise a conductivity probe 98 in the resin circulating pipe 64 and arranged between water outlet pipe 84 and stripping section 20 of the resin exchange column 16. A second conductivity probe 100 in resin circulating pipe 58 is arranged at a point below water pipe 72. A third conductivity probe 102 can be arranged in pipe 58 between spent pickle liquor pipe 14 and wash water pipe 76. These conductivity probes are responsive to changes in the conductivity of the solution in the ion exchange column 16 at their respective locations, and through an appropriate servo-mechanism actuate the respective line valves in response to such changes in conductivity measurements, as will be described more fully hereinafter.

The ion exchange resin column 16 can also be provided with drain pipe 104 controlled by valve 106 in the event draining and removal of the entire column is desired for cleaning or other purposes.

The following description of the operation of column 16 is made in connection with FIGURES 3 to 6 which are adapted for schematic illustration of the positioning of the various valves involved in the operation, to facilitate a better understanding of the same.

Referring first to FIGURES 3–6, which illustrate the condition of ion exchange column 16 during the loading and stripping cycle when resin regenerating agent is flowing upwardly through stripping section 20, and a separate portion of the ion exchange resin is being loaded with metal ions from the spent pickle liquor in loading section 18. As seen in FIGURE 3, during this cycle resin valves 60, 62 and 70 are closed and resin valve 68 is open. Valves 90 and 96 in pipes 88 and 94, respectively, are opened, permitting regenerating acid flow through and regenerating acid metal salt removal from stripping section 20. Valves 42 and 52 in spent pickle liquor charge line 14 and pickling acid discharge line 50, respectively, are opened, permitting downward flow of the spent pickle liquor through loading section 18. Valves 74 (line 72), 78 (line 76), 82 (line 80) and 86 (line 84) may be open or closed depending on conductivity signal.

After a predetermined time of passage of resin regenerating agent through the stripping section 20, and in accordance with the principles described and claimed in U.S. Patent 2,858,222, the column 16 is operated so as to shift and replace the ion exchange resin bed contained therein by introducing a fresh portion of metal ion loaded resin.

To effect this procedure, resin valve 68, regenerating acid valve 90 and metal salt valve 96 and spent pickle liquor valve 42 and regenerated pickling acid valve 52 are all closed. Resin valves 60, 62 and 70, and valve 82 in hydraulic water supply line 80 are all opened, introducing a hydraulic thrust therethrough line 80 at the top of lower resin reservoir 108. Valve 86 in line 84 remains closed to prevent any water outlet flow at that point. The condition of the valves during this cycle is shown in FIGURE 4.

The hydraulic thrust is applied in section 108. The resin in the reservoir is pushed around the loop, water and resin are pushed into water elimination section 110, regenerating acid and resin are pushed into stripping section rinse section 112, water is pushed into loading section 18, spent pickle liquor is pushed into loading section rinse section 114 and water and resin are pushed into upper resin reservoir 64. As shown in FIGURE 4, the regenerating agent/water interfaces 116 and 118 have also been moved about the loop along with the resin.

In the next step, valve 82 in hydraulic water supply line 80 is closed, resin valves 60, 62 and 70 are closed and resin valve 68 is open. The resin that had been pushed into upper reservoir section 64 drops into lower reservoir section 108. Valve 90 in regenerating acid line 88 is now opened along with valve 86 in line 84. As regenerating acid flows into stripping section 20, the regenerating acid/water interface travels upward into water elimination section 110. Conductivity probe 98 in section 110 senses the lower conductivity of water and prevents regenerating agent from being transferred out of the column through line 94 by maintaining valve 96 closed (see FIGURE 5). When regenerating agent hits the conductivity probe 98 in section 110, this closes valve 86, stopping the outlet of water through line 84 and valve 96 is opened to allow metal salt to leave the column through line 94.

Regenerating agent will also have surrounded conductivity probe 100 in said rinse section 112 which senses the increased conductivity and signals water to enter section 112 through line 72 by opening valve 74. Valve 74 is closed and the water flow ceases when the conductivity indicates that water is contacting the conductivity probe 100. In similar manner, the conducting metal ion loaded solution in section 114 is rinsed out with water admitted through line 76 and conductivity probe 102 indicates when the water/loading solution interface has passed below it. This conductivity control of water flow in the column loop prevents dilution or loss of regenerating agent not going through the ion exchange column loop, and also prevents dilution of the spent pickle liquor.

In the next step, valve 82 in hydraulic water supply line 80 remains closed, resin valves 60, 62 and 70 are closed, resin valve 68 is opened, and the metal loaded resin that had passed into section 64 drops into the lower reservoir section 108. Valve 74 in water supply line 72 is opened, along with valve 86 in water outlet line 84. The conductivity probe 98 in section 110 senses the low conductivity of water and prevents regenerating agent from being transferred out of the column but allows it to be pushed counterclockwise and up through section 110 to displace water that came in with the resin, water being admitted through line 72 for this purpose (see FIGURE 6).

Valve 78 is now closed and valve 42 opened for cycling spent pickle liquor through the loading section 18, the same being introduced through line 14 with regenerated pickling acid being withdrawn through line 50. After expiration of the established loading period, the resin movement cycle is thereafter repeated through the steps just described in connection with FIGURES 3, 4, 5 and 6.

An advantageous feature of the regenerating apparatus of this invention lies in the use of conductivity probes 98, 100 and 102 to detect the position of the various interfaces between different liquids in the column and prevent dilution or loss of metal salt and regenerating agent and also prevents dilution of the spent pickle liquor. While there is a certain disturbance of ion exchange resin in the column during its intermittent movement from one place to another, it has been found that the metal salt and regenerating agent/water interfaces form a definite boundary between the solutions. Because of this phenomenon, it has been possible to maintain safeguards to prevent adulteration of the metal salt or regenerating agent by inadvertent admixture thereof with water or the spent pickle liquor.

It will also be understood that it is a preferable feature of this invention to arrange automatic valve cycling in response to the basic time schedule and the sensing response of the respective conductivity probes. Thus, conductivity probe 98 can be arranged with suitable solenoid valves 86 and 96 so that 96 will remain closed and valve 86 will remain open until the metal salt interface 110 is above probe 98, but should the interface fall below probe 98, valve 96 is automatically closed and valve 86 is automatically opened.

During the cycling operation of the resin, as just described, it will be understood that the introduction of the rinse and pulse water into the column is accommodated through the overflow means, not shown above, delivery conduit 64. Some resin fines may be carried with this water overflow and to permit recovery of the same a settling tank (not shown) can be provided.

Attrition of the resin during the operation is made up through supply of additional resin, as required from a reservoir (not shown) in communication with delivery conduit.

Description of the apparatus and method of the evaporating unit

The metal salt solution leaving line 22 of the ion exchange column 16 is conducted to forced circulation, vertical tube evaporator 26 provided with reflux 28. The forced circulation evaporator can be any conventional unit, for instance a rubber lined steel unit provided with a plurality of vertical tube exchanges 12 and reflux unit 28. Any heating medium such as conventional external heating medium, steam, can be employed. Thus steam can be supplied by plant boiler (not shown) through a steam header and steam line 30. Steam condensate from the heat exchanger 26 discharges through line 122. The concentrated metal salt solution is withdrawn from the evaporation unit and conducted via line 36 to a forced circulation decomposition unit 38 such as a calciner. Fuel is admitted to the calciner via fuel line 124 together with air via line 126 and the temperature employed will depend upon the particular metal salt being decomposed to its oxide form and ranges generally from about 175° C. to 400° C. The solid metal oxide is removed via line 128 and constitutes an advantageous by-product of the overall process according to the present invention.

Vapors leaving the calciner 38 vapor exit line 130 are conducted to a scrub tower 40 via heat exchanger 132 employed to preheat the vapors prior to introduction into the scrub tower 40.

Description of the apparatus and method of the scrubbing unit

Vapors from the calciner 38 are introduced to the scrubbing tower via line 130. Scrubbing tower 40 can be of any conventional design and can be provided with a plurality of trays, such as the sieve type or bubble cap type or it can be packed tower. The flow of calciner effluent is countercurrent to the aqueous medium introduced to the scrub tower 40 via line 134. Waste gases are removed and exhausted to the atmosphere, for instance, through line 136 while the resin regenerating acid formed in the scrub tower is removed via outlet 138 and recycled to the regenerating unit 20.

Discussion of specific embodiments of the invention

As a specific embodiment of the invention and with reference to FIGURE 1 of the drawings herein, this system can be conveniently operated for the processing of 100,000 gallons per day of spent pickle liquor having a composition of 8.5 percent sulfuric acid and 13 percent iron sulfate to produce 31.8 tons per day of $Fe_2O_3$, 100,000 gallons of regenerated pickling acid, i.e. $H_2SO_4$ (17%).

Referring to the flow sheet, a quantity of 100,000 gallons per day of spent pickle liquor are removed from pickling tank 10 and introduced into the continuous ion exchange column loop 16 filled with a sulfonated polystyrene cation exchange resin, sold under the trade name of Dowex 50 W X 8, 20–50. Of course, other resins as well as resins having sizes ranging other than 20–50, say 16–100 can be used and are commercially available under the trade names such as Amberlite, Permutit Q, etc. The resins have a capacity of approximately 60 g. of iron exchanged per gram of resin. The spent pickle liquor flows downwardly through the loading zone of the resin which is 5 feet in diameter and 10 feet high. The resin is in hydrogen form after having been regenerated from previous use in stripping zone which is also 5 feet in diameter and 10 feet high. To treat the spent pickle liquor approximately 1300 cu. ft. of resin are employed and the resin is shifted in the column at a rate of about 10.2 cu. ft. per minute.

The treated spent liquor in the loading section is moved to the stripping section in predetermined periods of time, generally in pulses lasting for about 10–20 seconds, said pulses being actuated, for instance, about every two minutes. The pulses are imposed by the introduction of water to the column, the water being supplied at a rate of about 111,000 gallons per day. Rinse water is supplied adjacent each of the loading and stripping sections of the column at a rate of about 111,000 gallons per day.

Regenerating agent, nitric acid, is introduced to the stripping section 20 of the column at a rate of 60 tons per day. The nitric acid has a molar concentration of 4 and is supplied in amounts constituting a 20 percent excess of the stoichiometric amount required to combine with the iron value or the resin to provide iron nitrate. The column, preferably, is constructed of mild steel with a plastic lining or type 316 stainless steel. The sections of the column may be belled to 12" diameter butterfly valves and 12" elbows. Stainless steel pumps can be used for the iron nitrate solution while a bronze turbine pump can be employed for the resin pulsing.

Iron nitrate and nitric acid are withdrawn from the stripping section 20 of column 16 at a rate of 36,000 gallons per day and are concentrated in the stainless steel forced circulation evaporator to which is supplied 120,000 lbs. per day of steam. About 10,800 lbs. of water are removed per hour. From the evaporator the concentrated iron nitrate is decomposed in a gas fired, stainless steel rotary type kiln calciner operated at about 450° C. The B.t.u. input is about 200 million B.t.u. per day. Iron oxide is produced at a rate of about 31.8 tons per day.

The gaseous effluent from the calciner is introduced into a scrub tower, 5 feet in diameter and 35 feet high. The tower is of ceramic construction.

As an alternative to the above-described embodiment the pickling procedures can be carried out using hydrochloric acid in the pickling bath solution. Heretofore, the use of hydrochloric acid has been quite limited because of its cost since prior methods failed to provide economical recovery systems of hydrochloric acid from the spent pickle liquor. The fact that the use of hydrochloric acid resulted in a better quality surface than when sulfuric acid was used was not sufficiently determinative to influence the industry to employ hydrochloric acid on a wide scale. It has been found that, advantageously, a spent pickle liquor containing up to about 5 percent excess or free hydrochloric acid can be efficiently regenerated according to the instant invention. Higher amounts of free hydrochloric acid can be present in the spent pickle liquor although the higher concentrations result in adsorption of iron on the resin in reduced amounts. A spent pickle liquor containing 5% free hydrochloric acid (1.5 N) resulted in substantially complete iron sorption with about 50% resin capacity utilization.

As another embodiment of the instant invention, sulfamic acid alone or in combination with nitric acid can be used to regenerate the metal ion loaded resin in the stripping section. When as low as 0.15 N sulfamic acid is added to 4 M $NHO_3$ the iron in the iron nitrate was held to a low valency state such as in ferrous nitrate. Such results are advantageous in that it overcomes any gassing phenomenon which can occur within the column due to the oxidation of ferrous nitrate to ferric nitrate in the presence of excess nitric acid introduced into the column. Ordinarily, about 100 to 200 percent excess of nitric acid, over stoichiometric, is employed to strip the resin to a level of 0.2 to 0.4 equivalent/liter iron.

When sulfamic acid alone is used to strip the resin of iron values in situations where the pickle bath solution was made up from an acid such as sulfuric or hydrochloric, effective regeneration of the resin and recovery of the sulfamic acid can be achieved according to the process of the instant invention. Further, it has been found that rather than employing a calcination process the metal sulfamate can be subjected to plating techniques, resulting in efficient recovery of both metal oxide and sulfamic acid, the latter being suitable for recycle to the stripping section of the column.

As another variant in the instant process a fluidized bed technique of decomposing the metal salt from the regenerating unit and/or evaporator unit can be employed to produce the metal oxide and vapors which subsequently are scrubbed with an aqueous medium to recover resin regenerating agent. Thus, the metal salt solution produced in the ion exchange column can be converted to the metal oxide by introducing it into a fluidized bed reactor provided with fluidized solids such as coarse sand or Alundum, having a particle size ranging, preferably, from about −6 to 20 mesh. The bed can be operated at about 750° C. with a B.t.u. input of about 9 million B.t.u./hr. The main fluidized bed section can be 4 feet in diameter expanding to about 6 feet in diameter in the free board section. Overall height of the reactor can be about 10 feet.

The fluidized solids described above become coated with the metal oxide and grow in particle size. Continuous withdrawals of the metal oxide coated solids can be accomplished with regulated replenishment of solids as required. Air can be supplied to the reactor in amounts sufficient to fluidize the particles and the amount can be, for instance, about 1500 cu. ft./min. The air can be preheated with natural gas, consumed at a rate of about 7.5 cu. ft./min. The fluidized bed technique has also been found advantageous in association with procedures which include the pickling of aluminum metal.

It will be understood from the foregoing description that this invention is not limited to practice according to the specific embodiments illustrated and described herein, and that variations thereof can be made while not departing from the principles involved. This invention is, therefore, to be understood to be limited only by the spirit and scope of the following claims.

What is claimed is:

1. A continuous cyclic process for the pickling of metal, for regenerating spent pickle liquor and for regenerating an agent employed to regenerate said spent pickle liquor which comprises:

(1) conducting the pickling operation with a pickle liquor comprising an aqueous solution of a pickle liquor acid having an acid concentration maintained within the range of about 5 to 20 weight percent and a metal salt of said acid, the concentration of said metal salt being maintained within the range of about 1 to 10 weight percent.

(2) continuously withdrawing spent pickle liquor from the pickling step for regeneration, said regeneration comprising (3) flowing said spent pickle liquor through a first section of a cation exchange column loop having a shiftable cation exchange resin bed therein, to bring the same into contact with a first portion of cation exchange resin therein and exchanging metal ions from the spent pickle liquor for hydrogen ions of the exchange resin; while (4) withdrawing from said first section regenerated pickle liquor, (5) continuously recirculating said regenerated pickle liquor to said pickling step;

(6) treating a second portion of said cation exchange resin loaded with metal ions from (3) with a regenerating agent in a second section of said column loop;

(7) interrupting the flow of said spent pickle liquor and said regenerating agent;

(8) shifting the cation exchange resin bed in said cation exchange column loop from one section thereof to another contiguous section therein; thereby replacing at least a portion of said resin in said first section with another portion of said resin previously regenerated in said second section and displacing a portion of resin carrying the metal ions previously eliminated from the spent pickle liquor into said second section for regeneration thereof;

(9) withdrawing from said second section a solution of metal salt of regenerating agent;

(10) concentrating the withdrawn metal salt solution;

(11) decomposing the concentrated metal salt solution to provide a metal oxide and a gaseous product;

(12) treating said gaseous product to produce said regenerating agent;

(13) continuously recycling the regenerated regenerating agent to said second section of said column loop, and

(14) repeating the same cycle of steps 1–13 as long as desired.

2. The process of claim 1 wherein the pickle liquor acid has $pK_a$ ranging from $10^{-4}$ to 1.

3. The process of claim 1 wherein the acid concentration of the pickle liquor is maintained within the range of about 10 to 20 weight percent and the concentration of the metal salt of said acid is maintained within the range of about 1 to 10 weight percent.

4. The process of claim 1 wherein the pickle liquor acid is sulfuric acid.

5. The process of claim 1 wherein the pickle liquor acid is hydrochloric acid.

6. The process of claim 1 wherein the metal is iron.

7. The process of claim 1 wherein the metal salt in step (10) is concentrated to the point of incipient precipitation.

8. The process of claim 1 wherein the metal salt is decomposed in step (11) at a temperature ranging from about 175° to 400° C.

9. The process of claim 1 wherein the regenerating agent is nitric acid.

10. The process of claim 9 wherein sulfamic acid in amounts sufficient to stabilize the metal salt is employed with said nitric acid.

11. The process of claim 1 wherein the cation exchange resin has a mesh size ranging from 16–100 mesh.

12. The process of claim 11 wherein the cation exchange resin has a mesh size ranging from 20–50 mesh.

13. The process of claim 12 wherein the resin is a 4% cross-linked sulfonated styrene-divinyl benzene resin.

References Cited

UNITED STATES PATENTS

| | | | |
|---|---|---|---|
| 1,146,071 | 7/1915 | Hoffman | 134—13 |
| 2,185,095 | 12/1939 | Smith et al. | |
| 2,643,204 | 6/1953 | Mancke | 134—13 |
| 2,709,143 | 5/1955 | Francis et al. | 134—15 XR |
| 2,815,322 | 12/1957 | Higgins | 134—25 XR |
| 3,056,743 | 10/1962 | Eichhorn et al. | 210—33 |
| 3,116,240 | 12/1963 | Downey et al. | 134—41 XR |
| 3,205,168 | 9/1965 | Mihara et al. | 210—38 XR |
| 3,255,106 | 6/1966 | Reid et al. | 134—25 XR |
| 3,325,011 | 6/1967 | Keller | 210—189 XR |

FOREIGN PATENTS 570,338 2/1959 Canada.

OTHER REFERENCES

Regeneration of Acid From Spent Pickle Liquor, I & EC Trends, I & EC, vol. 57, No. 9, September 1965 (p. 11).

JOSEPH SCOVRONEK, Primary Examiner

JOSEPH T. ZATARGA, Assistant Examiner

U.S. Cl. X.R.

134—13, 15, 41; 210—33